United States Patent [19]

Pikulski et al.

[11] Patent Number: 4,708,431
[45] Date of Patent: Nov. 24, 1987

[54] FIBER OPTIC SOLDERABLE BULKHEAD FITTING

[75] Inventors: Joseph L. Pikulski, Thousand Oaks; O. Glenn Ramer, Los Angeles, both of Calif.

[73] Assignee: Hughes Aircraft Company, Los Angeles, Calif.

[21] Appl. No.: 783,515

[22] Filed: Oct. 3, 1985

Related U.S. Application Data

[63] Continuation-in-part of Ser. No. 572,731, Jan. 20, 1984, abandoned.

[51] Int. Cl.[4] .............................................. G02B 7/26
[52] U.S. Cl. ................................................. 350/96.20
[58] Field of Search ............... 350/96.15, 96.18, 96.20, 350/96.21, 96.23

[56] References Cited

U.S. PATENT DOCUMENTS

| | | | |
|---|---|---|---|
| 4,033,668 | 7/1977 | Presby | 350/96.21 |
| 4,119,363 | 10/1978 | Camlibel et al. | 350/96.20 |
| 4,296,996 | 10/1981 | Niiro et al. | 350/96.20 |
| 4,360,249 | 11/1982 | Slemon | 350/96.18 |
| 4,413,881 | 11/1983 | Kovats | 350/96.20 |
| 4,469,399 | 9/1984 | Cowen et al. | 350/96.20 |

FOREIGN PATENT DOCUMENTS

| | | |
|---|---|---|
| 0095280 | 5/1983 | European Pat. Off. |
| 0125795 | 11/1984 | European Pat. Off. |
| 0147105 | 11/1981 | Japan .............................. 350/96.20 |
| 2034068 | 5/1980 | United Kingdom . |
| 2078995 | 1/1982 | United Kingdom . |

OTHER PUBLICATIONS

Patent Abstracts of Japan, vol. 6, No. 145 (P-132), Aug. 4, 1982 and JP, A, 57-66404, 22 Apr. 1982.
Patents Abstracts of Japan, Vol. 7, No. 51 (p-179), 26 Feb. 1983, and JP, A, 57-198406, 6 Dec. 1982.
Patents Abstracts of Japan, vol. 7, No. 73 (p-186), 25 Mar. 1983, and JP, A, 58-4104, 11 Jan. 1983.
S. Masuda et al., "Low Loss Lens Connector for Single-Mode Fibers", Applied Optics, Vol. 21, No. 19, Oct. 1982, pp. 3475-3483.

Primary Examiner—Eugene R. LaRoche
Assistant Examiner—Steven J. Mottola
Attorney, Agent, or Firm—Terje Gudmestad; V. D. Duraiswamy; A. W. Karambelas

[57] ABSTRACT

Fiber optic solderable bulkhead fitting has a plated-on built-up metal body of a material which minimizes local stresses thereby minimizing microbending losses in the optical fiber. The body is sealed by solder within an opening in a bulkhead to provide a sealed passthrough for the optical fiber. In another embodiment, two optical fibers have plated-on built-up bodies thereon which serve to align the optical fibers in a connector. The connector is then sealed in a bulkhead as was done in the first embodiment.

2 Claims, 2 Drawing Figures

FIBER OPTIC SOLDERABLE BULKHEAD FITTING

This application is a continuation-in-part of application Ser. No. 572,731, filed Jan. 20, 1984, now abandoned.

BACKGROUND OF THE INVENTION

This invention is directed to a fiber optic bulkhead fitting wherein the optical fiber can be optically coupled through and soldered to a bulkhead.

Optical fibers are suitable for the transmission of digital information and are being increasingly used for that purpose. Optical fibers are superior to the employment of electrical conductors for a number of data transmission needs. However, there has been a problem in passing an optical fiber from one environment, through a bulkhead, to another environment because of the problems of reliably sealing the optical fiber to the bulkhead. Such sealing is necessary to provide sure separation between the spaces separated by the bulkhead. Accordingly, there is need for a bulkhead fitting which is compatible with both the optical fiber and the bulkhead to provide complete and reliable sealing.

Previous attempts at running an optical fiber through a bulkhead and sealing it with respect thereto have been unsatisfactory because of the microbending losses. When epoxy is used to seal an optical fiber with respect to a structure like a bulkhead, the forces on the optical fiber cause local changes in the index of refraction which is the microbending loss. With epoxy, the loss is about 1 decibel. This is a significant loss in such a system and cannot be tolerated in any but short, simple systems.

SUMMARY OF THE INVENTION

In order to aid in the understanding of this invention, it can be stated in essentially summary form that it is directed to a fiber optic solderable bulkhead fitting wherein an optical fiber has cladding substantially over its entire length and metal is plated on a portion of the cladding to form a metal built-up body structure and the metal built-up structure is sealable with respect to a bulkhead.

It is, thus, a purpose and advantage of this invention to provide a fiber optic solderable bulkhead fitting wherein an optical fiber is sealable with respect to the bulkhead to prevent an interchange of materials, such as gasses or liquids, between opposite sides of the bulkhead.

It is a further purpose and advantage of this invention to provide a fiber optic solderable bulkhead fitting wherein the optical fiber has a conductive coating thereon and a copper or other selected metal body structure is built up upon the coating so that the metal built-up body structure can, in turn, be sealed directly or indirectly with respect to a bulkhead.

Other purposes and advantages of this invention will become apparent from a study of the following portion of the specification, the claims and the attached drawings.

DETAILED DESCRIPTION OF THE INVENTION

Figure 1:
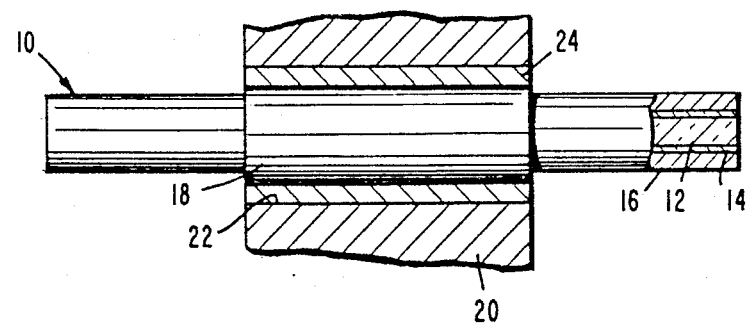
FIG. 1 is a side-elevational view of the first preferred embodiment of the fiber optic solderable bulkhead fitting of this invention, with the bulkhead being broken away and taken in section, and a part of the cladding removed from the optical fiber to show a section of the cladding.

Optical fiber 10 is the general indication of a typical coated optical fiber. Fiber core 12 is substantially transparent to the optical radiation of interest. It preferably carries an optical cladding 14 and an aluminum coating 16. Such fibers can be made sufficiently flexible and optically transmissive to achieve the results required of optical fibers.

Copper body 18 is a built-up structure on coating 16 of fiber 10 when coating 16 is of an inorganic material such as aluminum. Alternatively, copper body 18 is a built-up structure directly on optical cladding 14 of fiber 10 when coating 16 is of an organic material coating 16 being removed therefrom prior to the beginning of the build-up process. When optical cladding 14 is the exterior material of the fiber, i.e., organic coating 16 removed, the length on which the body 18 is to be deposited can be made conductive by vapor deposition of silver or gold as a first step. Copper is particularly selected for use in built-up body 18 because it can be evenly and easily deposited to eliminate localized forces which cause microbending and consequent transmission losses. Other metals would be selected for the built-up structural body when found to be suitable for this even, localized-force-free deposition.

The copper body 18 is built up by electroplating. A suitable electroplating bath is prepared as follows: Two hundred twenty-five grams of copper sulphate are dissolved per liter of water. Fifty-five grams of sulfuric acid are also added per liter to provide the copper plating electrolyte. Added to the plating electrolyte solution is one-half milliliter of UBAC solution No. 1 per liter of electrolyte. This material is available from Udylite-Omic, 21441 Hoover Road, Warren, Mich. 48089. This mixture acts to improve the fineness of the copper grain in the electrolytic buildup. The finer the copper grain, the less stress created on the optical fiber. In the alternative, blackstrap molasses is also useful for the purpose of improving the fineness of the copper again.

It is critical to the plating that the plating current be a maximum of 180 milliamperes per square inch. A higher current accelerates the ions in the plating solution and this, in turn, produces random orientation which results in graininess. Currents lower than the maximum current improve the fineness of the copper grain. The preferred current is 90 milliamperes per square inch. The plating voltage is from 0 to 3 volts, and the electrolyte temperature is maintained at 70 to 80 degrees F. The concentration of UBAC solution No. 1 in the electrolyte is maintained during the plating operation.

The plating operation must be carefully performed to minimize stresses in the copper plated body 18 which would cause microbending. Microbending, localized changes in the optical fiber's index of refraction, is caused by forces applied to fiber 10. Copper body 18 is thereby deposited without substantial effect upon fiber 10. The result is that the copper body 18 produces a transmission loss of less than 0.1 decibels in the fiber. Plating continues until the copper body 18 is built up to a desired size, on the order of 0.025" or more. Besides having a fine or low graininess structure, the coating must be sufficiently thick so as to create a substantially rigid structure so that stress is not applied to the fiber. If built-up body 18 is too thin, the application of solder, welding or epoxy materials will deform or stress the fiber as previously discussed. This stress, or microbending alters the refractive properties of the fiber, deleteriously affecting its transmission properties.

EXAMPLE I

The plating solution described above was used to plate a built-up body on an optical fiber having a 0.005" diameter (including the core and cladding) as well as a 0.001" aluminum coating.

A plating current of 25 milliamps was used over a period of 8 hours, without replenishment, in order to plate approximately 0.050" thickness of copper on the outer surface of the coated fiber.

The built-up metallic body produced was sufficiently thick and rigid so as to allow grasping with tools and working the end of the fiber, as in polishing or shaping, without damaging the transmission of the fiber. The metallic body could also be soldered into a bulkhead.

EXAMPLE II

The previously described plating solution was also used with a 25 milliamp current for a period of 4 hours, without replenishment, in order to electrodeposit a coating of approximately 0.098" thickness on the surface of a 0.005" diameter (core and cladding) aluminum coated fiber.

Bulkhead 20, illustrated in FIG. 1, is an example of a bulkhead through which the optical fiber 10 is to pass and be sealed with respect thereto. Opening 22 is formed in bulkhead 20 and fiber 10 carrying copper body 18 is placed through the opening with the copper body 18 within opening 22. Thereupon, the optical fiber is sealed in place by the application of solder 24 to completely hermetically seal the fiber within the opening. This method does not require additional parts or sealing members to complete the bulkhead fitting. Also, the fiber does not require additional support members since it is rigidly held by the built-up metallic body.

In order to prevent damage to the optical fiber with its cladding, a lower temperature solder such as a lead-tin or lead-indium solder is preferably employed. In this way, optical fiber 10 passes through bulkhead 20 and is completely sealed by solder 24 with respect thereto.

Figure 2:
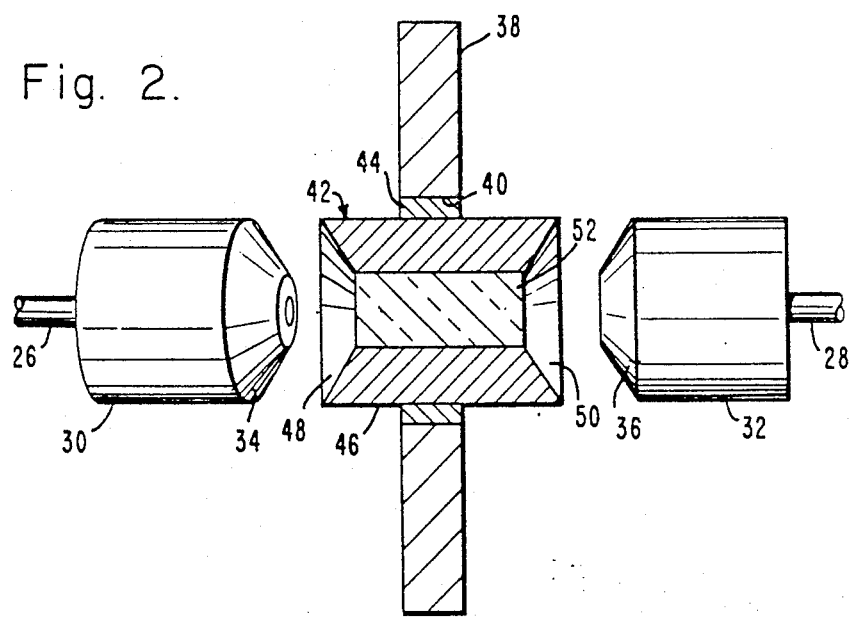
FIG. 2 is an exploded side view, partly in perspective, and with the bulkhead taken in section of the second preferred embodiment of the fiber optic solderable bulkhead fitting in accordance with this invention.

FIG. 2 illustrates a second preferred embodiment of the bulkhead fitting of this invention. Optical fibers 26 and 28 have ends facing each other and carrying built-up structures 30 and 32 respectively. The built-up structures respectively carry mating surfaces 34 and 36 thereon so that the fibers can be physically positioned as described below. Optical fibers 26 and 28 are the same as optical fiber 10 in FIG. 1 while built-up structures 30 and 32 are built up in the same way as the copper body built-up structure 18 also of FIG. 1.

Bulkhead 38 has an opening 40 therethrough into which is secured connector 42 by means of sealing material 44. Sealing material 44 is compatible with both the body 46 of connector 42 and the bulkhead 38. Sealing material 44 is preferably a solder to provide a secure and hermetic seal.

Connector 42 has faces 48 and 50 which receive the mating surfaces 34 and 38 to positively align the ends of the optical fibers 26 and 28 respectively. Body 46 is closed in the center by means of window 52 which optically connects fibers 26 and 28. Window 52 is of suitable optical properties for the wave length to be transmitted and can be a lens such as a Selfoc self-focusing lens or a Fresnel lens, and the lenses may be made of such materials as glass, quartz, sapphire, or germanium, depending upon the optical requirements. In a preferred embodiment, the connector body 46 is built up on window 52 as a copper body built-up structure as previously described. Mating surfaces 34 and 36 as well as their joining faces 48 and 50 are machined to provide the optimum optical coupling.

While the fibers 10, 26 and 28 are described as being metal-coated fibers, and such is the most preferred embodiment, it is also clear that the built-up body can also be plated onto bare fibers or organically coated fibers by first applying an electrically conductive layer, such as an evaporated-on silver or gold film. However, when using organically coated fibers it is preferable to remove the organic coating prior to applying the electrically conductive layer, as most organic coatings do not provide a true hermetic seal and therefore will not seal a bulkhead.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A fiber optic solderable bulkhead fitting comprising:
   a bulkhead having an opening therethrough;
   a connector positioned within said opening and sealed with respect thereto, said connector having end faces positioned on opposite sides of said bulkhead;
   a member having optical transmissivity extending through said connector and terminating in said end faces;
   first and second optical fibers each having an end; and
   first and second metallic built-up bodies respectively on said fibers adjacent the ends thereof, said metallic built-up bodies being of a fine metallic grain structure to minimize microbending of said optical fiber and being of a thickness to provide a rigid structure which is resistant to engagement forces with said connector, said bodies each having a mating surface thereon so that when said metallic built-up bodies are engaged with said end faces on said connector, said optical fibers are in optical communication through said member having optical transmissivity.

2. The fiber optic solderable bulkhead fitting of claim 1 wherein said built-up bodies are metallic copper bodies electroplated onto said optical fibers adjacent the ends thereof.

* * * * *